(12) United States Patent
Wilson et al.

(10) Patent No.: US 9,753,790 B2
(45) Date of Patent: Sep. 5, 2017

(54) DATA PROCESSING SYSTEM HAVING MESSAGING

(71) Applicant: FREESCALE SEMICONDUCTOR, INC., Austin, TX (US)

(72) Inventors: Peter J. Wilson, Leander, TX (US); Brian C. Kahne, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/828,722

(22) Filed: Aug. 18, 2015

(65) Prior Publication Data

US 2017/0052834 A1    Feb. 23, 2017

(51) Int. Cl.
 G06F 9/54    (2006.01)
 G06F 9/30    (2006.01)

(52) U.S. Cl.
 CPC .......... *G06F 9/546* (2013.01); *G06F 9/30087* (2013.01)

(58) Field of Classification Search
 None
 See application file for complete search history.

(56) References Cited

U.S. PATENT DOCUMENTS

| | | | |
|---|---|---|---|
| 6,178,174 B1* | 1/2001 | Franke | H04L 47/10 370/429 |
| 2005/0132089 A1* | 6/2005 | Bodell | G06F 13/385 709/249 |
| 2010/0232448 A1* | 9/2010 | Sugumar | G06F 15/17337 370/412 |

OTHER PUBLICATIONS

Masamichi Takagi, Revisiting Rendezvous protocols in the context of RDMA capable host channel adapters and many-core processors, Sep. 2013, pp. 1-6.*
Birrell et al, "Implementing Remote Procedure Calls", ACM Transactions on Computer Systems, Feb. 1984, pp. 39-59, vol. 2, No. 1.

* cited by examiner

*Primary Examiner* — Syed Roni

(57) ABSTRACT

A method of handling requests between contexts in a processing system includes, in a current context of a source processing system element (PSE): executing a send-and rendezvous instruction that specifies a destination PSE, a queue address in the destination PSE, a set of source registers, and a set of receive registers; and sending a send-and-rendezvous message (SRM) to the destination PSE, wherein the SRM includes an address of the destination PSE, a destination queue address, a source PSE address, and an identifier of the current context in the source PSE.

16 Claims, 4 Drawing Sheets

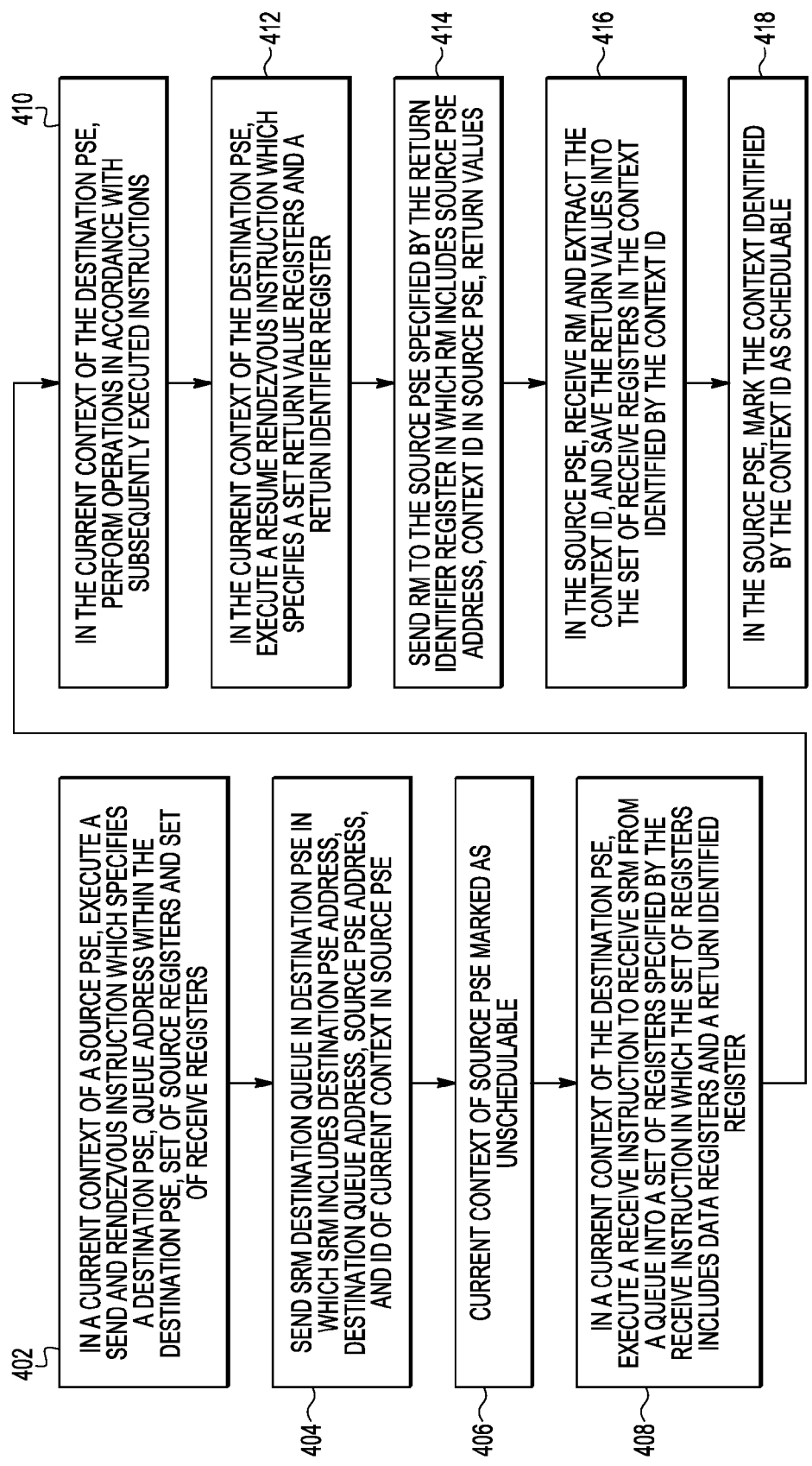

DATA PROCESSING SYSTEM HAVING MESSAGING

BACKGROUND

Field

This disclosure relates generally to data processing system architecture, and more specifically, to data processing systems having messaging.

Related Art

Multiprocessor computer systems have been known for many years, but their architecture, in particular how software running on one processor interacts with software running on another processor has generally made use of expensive and inefficient mechanisms such as shared memory and interprocessor interrupts. Thus facilities for cost-effective and efficient inter-program communication are rare. Further, shared-bus systems limited the maximum number of processors to a dozen or two (for cache-coherent SMPs), although 'clusters' could get much larger at the expense of having the expected cache behavior be managed explicitly by software instead of hardware.

Current Very-Large-Scale integration (VLSI) technology is pushing system architectures to embrace an increasingly large number of processing units (or other intelligent agents) on a single chip. This means that increasingly software running on or controlling agents will need to efficiently communicate across processing units and agents. Current practice such as shared memory, interprocessor interrupts, etc., is slow and does not scale well, in addition to often requiring expensive and also difficult to scale cache-coherent shared memory.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 4 illustrates, in flow diagram form, operations performed during messaging within the data processing system of FIG. 1 in accordance with one embodiment of the present invention.

DETAILED DESCRIPTION

Embodiments of systems and methods disclosed herein provide messaging between processing system elements or within processing system elements of a data processing system. In one embodiment, send-and-rendezvous and resume rendezvous instructions are used to send and receive a message without the need for a message queue on the source side. Execution of a send-and-rendezvous instruction in a current context of a source processing element sends a message to a destination processing element and suspends the current context of the source processing element. Messaging circuitry within the destination processing element receives the message, and after the destination processing element performs the operation or act indicated by the message, the destination processing element executes a resume rendezvous instruction. In response to execution of the resume rendezvous instruction, a return message is sent back to the source processing element. Upon arrival, the message data is copied into the appropriate registers of the source processing element and the context which was previously suspended is again marked ready for execution. When this context is eventually executed, the data from the receive message is ready for use within the register file of the resumed context. In this manner, there is no need to allocate, use, or initialize a response message queue in the source processing element, thus allowing for improved messaging efficiency.

Figure 1:
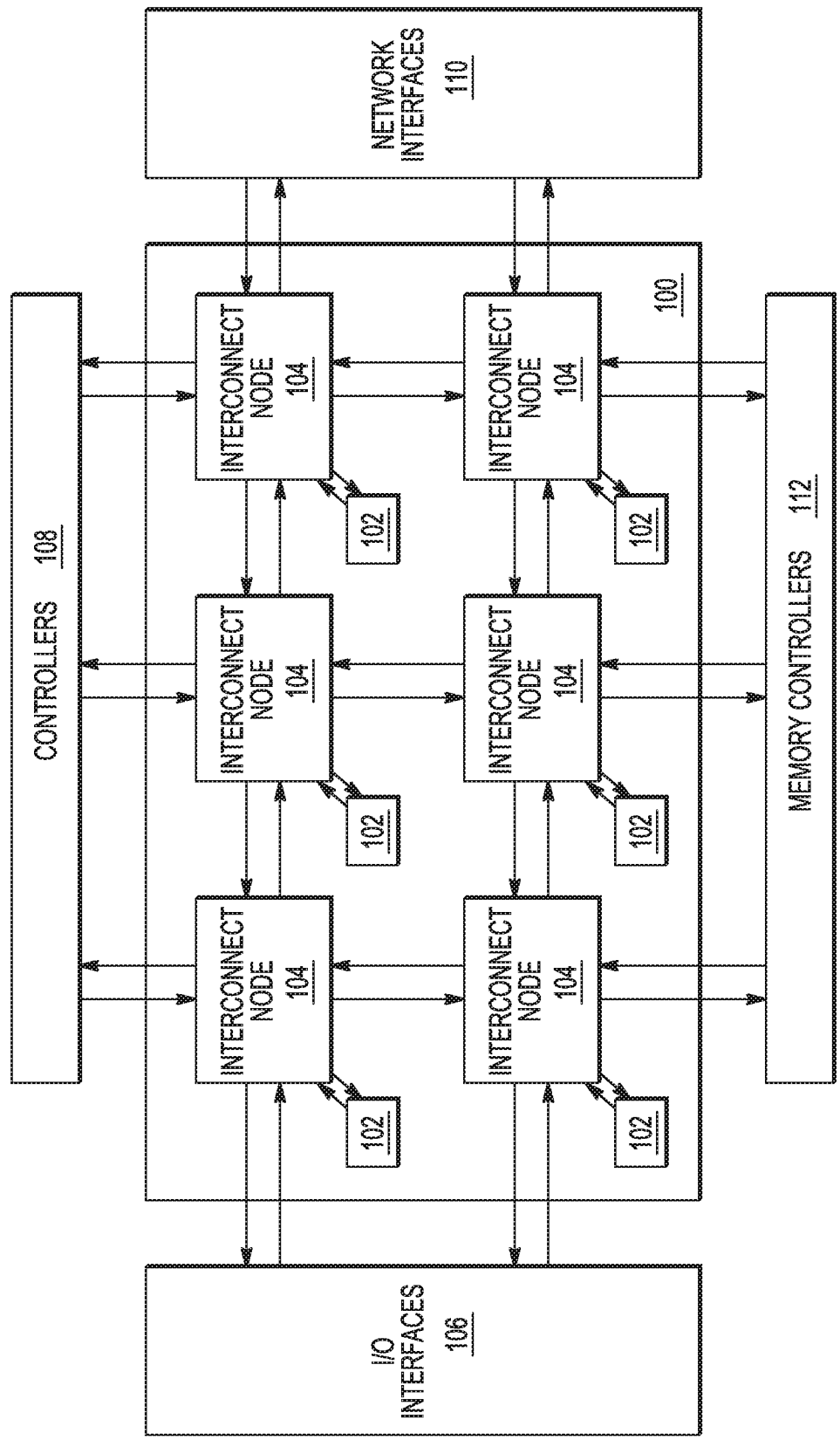
FIG. 1 illustrates, in block diagram form, a data processing system having multiple processing system elements in accordance with an embodiment of the present invention.

FIG. 1 illustrates a data processing system 10 having multiple processing system elements 102 in accordance with one embodiment of the present invention. A processing system element 102 may be any type of processing element, such as, for example, a processor core, a memory controller, a direct memory access (DMA) engine, or the like. When a processing system element 102 is to be used in a system 100 of many interconnected processing system elements 102, a system interconnect other than a bus can be used. Often a mesh of interconnects is appropriate. Such a mesh 100 of interconnect nodes 104 is shown in FIG. 1 depicting an array of interconnect nodes 104 connected to other interconnect nodes 104 in respective north, south, east and west directions. In this manner, each interconnected node 104 may be addressed using X, Y coordinates. Interconnect node 104 can be associated with and configured to communicate with a respective processing system element 102. Interconnect nodes 104 can operate concurrently, and thus data transfers may be occurring on all of the interconnect nodes 104 simultaneously. Resources such as memory controllers 108, 112, I/O device interfaces 106, and network interfaces 110 may be configured to communicate with mesh 100.

In alternate embodiments, alternate system interconnects may be used, other than a mesh as illustrated in FIG. 1, to interconnect processing system elements 102. For example, such interconnects include a cross-bar switch, a ring interconnect, a bus, a point-to-point mesh fabric, a mesh with diagonal interconnects, a high-order hypercube interconnect, multiple buses with interbus bridges, or the like.

Figure 2:
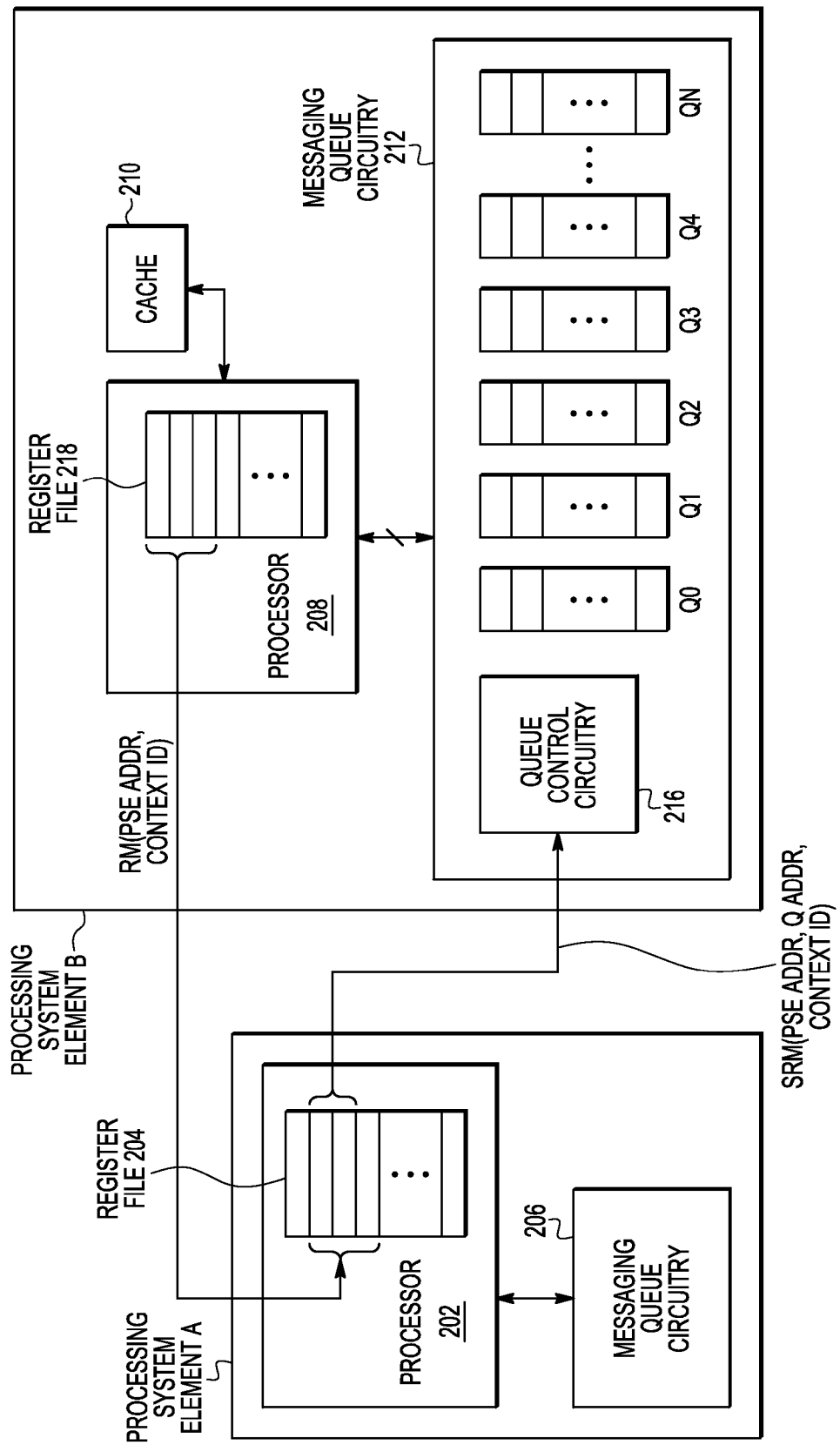
FIG. 2 illustrates in block diagram form, a processing system element A and a processing system element B of the data processing system of FIG. 1 in accordance with one embodiment of the present invention.

FIG. 2 illustrates an example processing system element A of FIG. 1 and an example processing system element B of FIG. 1. Processing system elements A and B can be any two of processing system elements 102 of FIG. 1. Processing system element A includes a processor 202 and messaging queue circuitry 206. Processor 202 includes a register file 204 and is bidirectionally coupled to messaging queue circuitry 206. Although only one register file is illustrated, processor 202 may include any number of register files. For example, processor 202 may execute any number of contexts, and each context can have its own register file. In FIG. 2, register file 204 corresponds to the register file of a current context of processor 202. Processing system element B includes a processor 208, a cache 210, and message queue circuitry 212. Processor 208 is bidirectionally coupled to cache 210 and messaging queue circuitry 212. Processor 208 includes a register file 218. As in processor 202, processor 208 may include any number of register files, such as one for each context. In FIG. 2, register file 218 corresponds to the register file of a current context of processor 208.

Messaging queue circuitry 212 includes queue control circuitry 216 and N+1 message queues Q0-QN. Each queue has the capacity to store one or several messages. Queue control circuitry 216 is coupled to the messaging queues and to processor 202 of processing system element A. Note that messaging queue circuitry 206 of processing system element A may include similar elements as messaging queue circuitry 212 of processing system element B. Also, processing system element A may also include a cache coupled to processor 202, similar to cache 210. Cache 210 may be any type of cache memory, and in one embodiment, is a level one cache of processor 208.

In operation, in a system of interconnected processing system elements such as system 10, concurrent software programs need the ability to communicate between processing system elements. Therefore, messages can be communicated between processing system elements 102 of system 10. Each processing system element 102 of system 10 is capable of sending and receiving messages using send-and-rendezvous and resume rendezvous instructions. Each processing system element 102 may be a single thread processing element or a multi-threaded processing element. In the case of a multi-threaded processing element, the processing element may include multiple contexts, in which messages can be sent or received by any thread within any context of the multi-threaded processing element. Furthermore, messages can be sent or received between contexts within a processing element. A context may refer to the register elements capable of holding the complete state of an executing thread. While a thread maps to a hardware context, a processing element may be executing more threads than it has contexts. In this case, the multiplexing of threads onto contexts may be handled via hardware or software running on the processing element.

Figure 3:
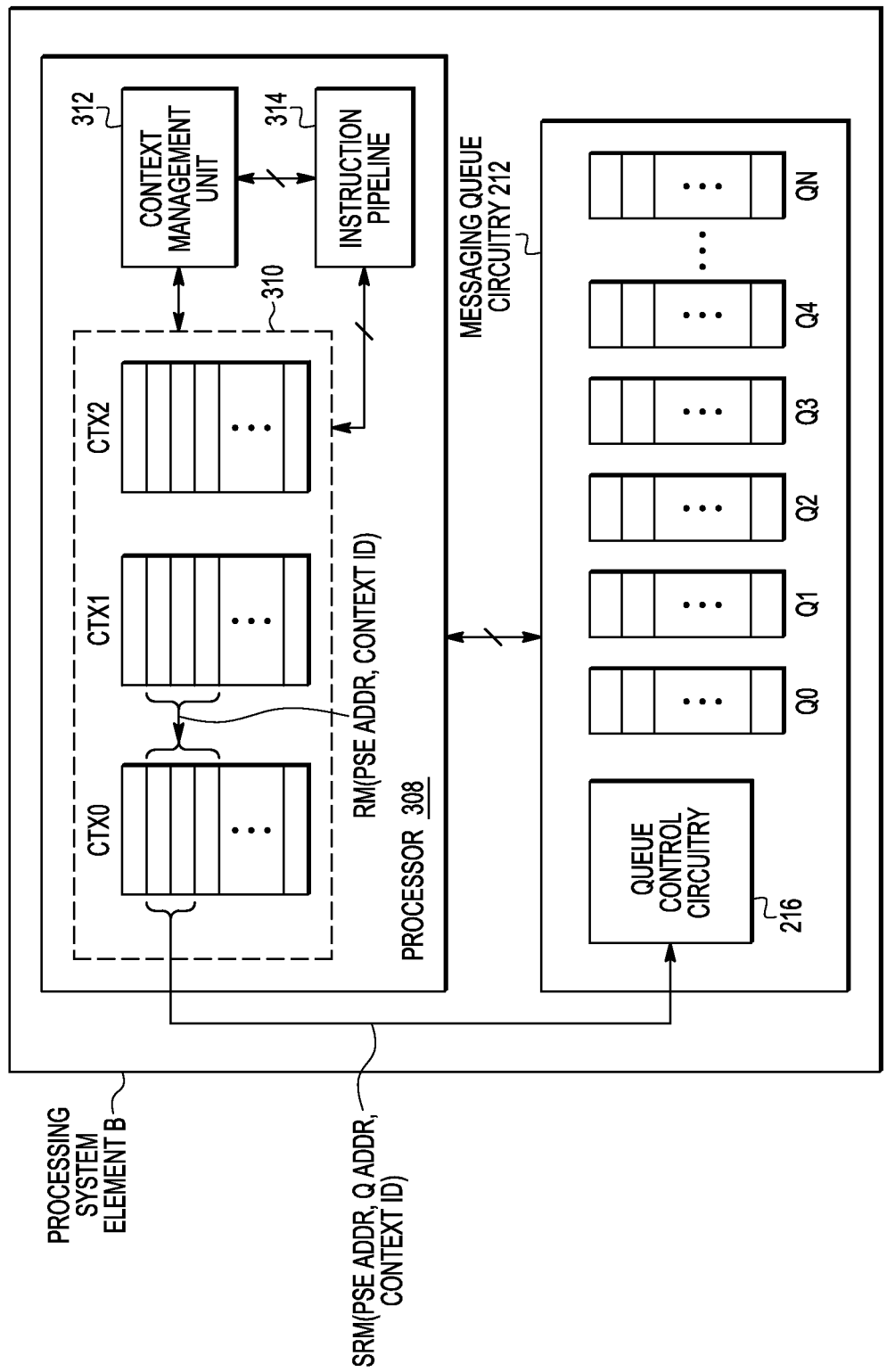
FIG. 3 illustrates, in block diagram form, a processing system element B of the data processing system of FIG. 1 in accordance with one embodiment of the present invention.

Operation of the send-and-rendezvous and resume rendezvous instructions will be described in more detail in reference to the flow diagram of FIG. 4. The flow diagram of FIG. 4 applies to use of the send-and-rendezvous and resume rendezvous instructions for both inter processing system element messaging and intra processing system element messaging. In the former case, the source processing system element (PSE) and the destination PSE are different PSEs within system 10, and in the latter case, the source and destination are a same PSE in which messages are transferred between different contexts of the PSE. FIG. 2 illustrates, in block diagram form, an example of inter PSE messaging in which processing system element A corresponds to the source PSE and processing system element B corresponds to the destination PSE. FIG. 3 illustrates, in block diagram form, an example of intra PSE messaging in which messages are transferred between different contexts within processing system element B. (Note that FIG. 3 will be described in further detail below, after the discussion with respect to FIG. 2.)

Referring back to FIGS. 2 and 4, FIG. 4 illustrates, in flow diagram form, a method 400 for implementing a send-and-rendezvous and a resume rendezvous instruction in accordance with one embodiment. In block 402 of FIG. 4, in a current context of a source PSE, a send-and-rendezvous instruction is executed which specifies a destination PSE, a queue address within the destination PSE, a set of source registers of the current context, and a set of receive registers. Therefore, referring to FIG. 2, processor 202 can execute a send-and-rendezvous instruction in which, upon executing the instruction, processor 202 formulates a send-and-rendezvous message (SRM) to be sent to a destination queue within a destination processing system element, such as processing system element B. The SRM includes the contents of one or more registers in the register file of the source processing system element which were specified by the send-and-rendezvous instruction. The contents of the selected registers may include any type of information, such as data values, commands, or combinations thereof. In the example of FIG. 2, the second and third registers of register file 204 are specified by the send-and-rendezvous instruction as the set of source registers of the current context, and therefore the contents of these registers are included in the SRM. The SRM also includes a processing system element address (PSE ADDR) which specifies the destination PSE, a queue address (Q ADDR) which specifies a queue within the messaging circuitry of the destination PSE in which the SRM is to be stored, and a context ID which identifies the current context of the source PSE which was associated with (i.e. which executed) the send-and-rendezvous instruction.

Method 400 proceeds to block 404 in which the SRM is sent to the destination queue in the destination PSE. As illustrated in the example of FIG. 2, the contents of two registers of register file 204 are sent in the SRM to queue control circuitry 216 of processing system element B (identified by PSE ADDR), in which the Q ADDR identifies one of Q0-QN of messaging queue circuitry 212.

Note that messages can move from one interconnect node 104 to another from the source processing system element until the messages reach their destination processing system element 102 as indicated by the PSE ADDR. Known routing protocols may be used to route a message from a processing system element 102 to a destination processing system element 102. For example, in some embodiments, messages can be routed by traversing mesh 100 vertically, then horizontally. Each interconnect node 104 knows its own coordinates in the x*y grid of interconnect nodes 104, and a message arriving can have an address specified by (X, Y) as a coordinate in the grid.

Referring back to FIG. 4, method 400 continues with block 406 in which the current context of the source PSE which executed the send-and-rendezvous instruction is marked as unschedulable. In this manner, the current context of processing system element A is suspended and cannot continue execution nor be scheduled again for execution until processor 202 again marks the context as schedulable.

Method 400 proceeds to block 408 in which, in a current context of the destination PSE, a receive instruction is executed to receive the SRM from a queue of the messaging queue circuitry into a set of registers of the destination PSE specified by the receive instruction in which the set of registers includes data registers and a return identifier register. Therefore, referring to the example of FIG. 2, processor 208 can execute a receive instruction to receive the SRM from the appropriate queue in messaging queue circuitry 212. Processor 208 communicates with queue control circuitry 216 to determine which of Q0-QN includes the received SRM. Processor 208 then stores the SRM into a set of registers within register file 218 (which corresponds to the current context of processor 208) as specified by the receive instruction. The set of registers within register file 218 includes data registers in which the contents of the registers from register file 204 included in the SRM are stored and includes a return identifier register which stores the PSE ADDR of the source PSE, which in this example, is the PSE ADDR of processing system element A.

Method 400 proceeds to block 410 in which, in the current context of the destination PSE, operations are performed in accordance with subsequently executed instructions. For example, once the receive instruction is executed in the current context by processor 208 and the contents of the received SRM get transferred into register file 218, processor 208 continues to execute instructions and perform corresponding operations, which may use the contents of the SRM which is now stored in register file 218 (received from register file 204 of processing system element A). Results of the executed instructions, corresponding to the return values of the operations, are stored in a set of return value registers within register file 218. In the example of FIG. 2, this set corresponds to the first, second, and third registers of register file 218.

Method 400 proceeds to block 412 in which, in the current context of the destination PSE, a resume rendezvous instruction is executed which specifies a set of return value registers and a return identifier register. In the current example, the resume rendezvous instruction specifies the first, second, and third registers of register file 218 as well as the return identifier register which stores the PSE ADDR of processing system element A. Method 400 then proceeds to block 414 in which the a return message (RM) is sent back to the source PSE specified by the return identifier register. The RM includes the source PSE address, the context ID in the source PSE, and the return values. Therefore, referring to the example of FIG. 2, the RM includes the PSE ADDR of processing system element A, the context ID of the context of processing system element A which executed the original send-and-rendezvous instruction, and the contents of the first, second, and third registers of register file 218.

Method 400 proceeds to block 416 in which the RM is received by the source PSE. Upon receiving the RM, the context ID is extracted, and the return values are saved into the set of receive registers (specified in the original send-and-rendezvous instruction) in the context identified by the context ID. Referring to the example of FIG. 2, the return values (which were stored in the first, second, and third registers of register file 218) are saved into the second, third, and fourth registers of register file 204, which belong to the context identified by the context ID. Note that the return values are directly stored into the register file of the context identified by the context ID and did not need to be first stored into a messaging queue of messaging queue circuitry 206 and received by way of executing a receive instruction. In this manner, the latency introduced by executing a receive instruction to receive a message and processing a message from a messaging queue is avoided.

Method 400 proceeds to block 418 in which, in the source PSE, the context identified by the context ID is marked as schedulable. In the example of FIG. 2, processor 202 marks the context (corresponding to register file 204) as schedulable. Upon being scheduled, note that the return values are already stored in register file 204 and ready for use upon resuming the context. Therefore, upon executing a send-and-rendezvous instruction, an SRM is sent to a destination PSE and the current context of the source PSE is suspended. In this case, processor 202 may either remain idle or may switch to a different context. Note that the context which executed the send-and-rendezvous instruction cannot be resumed until the return values are first received and stored into the register file of the suspended context. Therefore, upon resuming the context, it is guaranteed that the return values needed in response to the send-and-rendezvous instruction from the destination PSE are stored within the register file of the resumed context and thus immediately available for use.

FIG. 3 illustrates, in block diagram form, processing system element B in which like numerals with FIG. 2 illustrate like elements. Processing system element B includes a processor 308 bidirectionally coupled to messaging queue circuitry 212. Processor 308 includes a set of register files 310, which includes a register file corresponding to each of contexts CTX0, CTX1, and CTX2. Note that while only 3 contexts are illustrated, processor 308 may include any number of contexts, and thus, register files within set 310. Processor 308 includes a context management unit 312 coupled to set 310, and an instruction pipeline 314 coupled to context management unit 312 and set 310. Context management unit 312 controls context switching within processor 308. (Also, note that processor 208 also includes an instruction pipeline and may also include a context management unit.)

FIG. 3 illustrates an example of intra processing system element messaging, in which method 400 still applies. For example, it is assumed that processor 308 is executing in the current context of CTX0. In this current context, instruction pipeline 314 executes a send-and-rendezvous instruction which specifies processing system element B as the destination PSE, specifies a queue address within messaging queue circuitry 212, identifies the second and third registers of CTX0 as the set of source registers, and specifies a set of receive registers. Therefore, an SRM including the PSE ADDR of processing system element B, the Q ADDR, the context ID for CTX0, and the contents of the source registers is provided by processor 308 to queue control circuitry 216. That is, note that the source PSE is the same as the destination PSE (processing system element B, in this example). The SRM is stored into one of Q0-QN as identified by Q Addr. Also, upon executing of the send-and-rendezvous instruction, the CTX0 is marked as unschedulable, thus suspending CTX0.

Context management unit 312 can then switch to a different context, such as CTX1. In this context, instruction pipeline 314 can execute a receive instruction to receive the SRM from messaging queue circuitry 212 into a set of registers within the register file of CTX1 as specified by the receive instruction. As described above, the set of registers specified by the receive instruction includes data registers and a return identifier register (which identifies processing system element B in this example). Processor 308, in context CTX1, performs operations in accordance with subsequently executed instructions and stores return values into a set of return value registers, which, in the example of FIG. 3, corresponds to the second, third, and fourth registers of the register file of CTX1.

Processor 308, in context CTX1, can then execute a resume rendezvous instruction which specifies a set of return value registers and a return identifier register. The RM is sent to the source PSE (which, in the current example, is processing system element B) in which the RM includes the source PSE ADDR, context ID in the source PSE, and the contents of the set of return value registers. Therefore, in processing system element B, the RM is received and the context ID (corresponding to CTX0 in this example) is extracted. The return values are stored into the set of receive registers of CTX0 identified by the original send-and-rendezvous instruction. In the current example, the return values are stored into the second, third, and fourth registers of the register file of CTX0. Processor 308 can then indicate to context management unit 312 that CTX0 is again schedulable. Upon resuming CTX0, it is guaranteed that the return values needed in response to the send-and-rendezvous instruction are stored within the register file of CTX0 and thus immediately available for use Also, as with the example of FIG. 2, the latency introduced by executing a receive instruction to receive a message and processing a message from a messaging queue is avoided.

By now it should be apparent that embodiments of systems and methods disclosed herein provide for improved messaging in which return values can be received in response to a send-and-rendezvous instruction without needing to execute a receive instruction and incur latency due to processing a return message queue within the original destination PSE. Furthermore, upon execution of the send-and-rendezvous instruction, the current context of the source PSE is suspended and cannot be resumed until the return values are first received and stored into the register file of the suspended context. In this manner, upon resuming the context, it is guaranteed that the return values needed in response to the send-and-rendezvous instruction from the destination PSE are stored within the register file of the resumed context and thus immediately available for use.

The terms "software" and "program," as used herein, are defined as a sequence of instructions designed for execution on a computer system. Software, a program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary data processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 300, for example, from computer readable media such as memory or other media on other computer systems. Such computer readable media may be permanently, removably or remotely coupled to an information processing system such as system 300. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Embodiments disclosed here can be implemented in various types of computer processing systems such as a server or a personal computer system. Other embodiments may include different types of computer processing systems. Computer processing systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process. An operating system control operation of the CPU and main memory units as well as application programs.

As used herein, the term "bus" is a system interconnect and is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, indicator, status bit, or similar apparatus into its logically true or logically false state, respectively. If the logically true state is a logic level one, the logically false state is a logic level zero. And if the logically true state is a logic level zero, the logically false state is a logic level one.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one embodiment, a processing system includes a source processing system element configured to: execute a send-and-rendezvous instruction to send a send-and-rendezvous message to a destination processing system element, wherein the send-and-rendezvous instruction specifies the destination processing system element, a queue address within the destination processing system element, a source register in the source processing system element, and a receive register in the source processing system element; and receive a response message from the destination processing system element, wherein the response message is associated with the send-and-rendezvous message and return values in the response message are copied into the receive register when the response message is received. In one aspect, the source processing system element is further configured to: suspend a context that executed the send-and-rendezvous instruction after the send-and-rendezvous message is sent; mark the context as ready for execution after the return values in the response message are copied into the receive register, wherein the source register and the receive register are associated with the context. In another aspect, the send-and-rendezvous message specifies an address of the destination processing system element, the queue address within the destination processing system element, an address of the source processing system element, and an identifier of a context associated with the send-and-rendezvous message. In another aspect, the response message specifies an address of the source processing system element, the return values, and an identifier of a context associated with the send-and-rendezvous message. In another aspect, the destination processing system element is configured to: execute a receive instruction to receive the send-and-rendezvous message, wherein the receive instruction specifies a register for receiving information in the send-and rendezvous message. In another aspect, the destination processing system element is configured to: execute a resume rendezvous instruction to generate the response message, wherein the resume rendezvous instruction specifies a return value register and a return identifier register; and send the response message to the source destination processing system. In another aspect, the source processing system element is the same as the destination processing system element. In a further aspect, the processing system further includes a first context associated with the source processing system element; and a second context associated with the destination processing system element.

In another embodiment, a method of handling requests between contexts in a processing system includes in a current context of a source processing system element (PSE): executing a send-and rendezvous instruction that specifies a destination PSE, a queue address in the destination PSE, a set of source registers, and a set of receive registers; and sending a send-and-rendezvous message (SRM) to the destination PSE, wherein the SRM includes an address of the destination PSE, a destination queue address, a source PSE address, and an identifier of the current context in the source PSE. In one aspect, the method further includes marking the current context as unschedulable. In another aspect, the method further includes in a current context of the destination PSE, executing a receive instruction to receive information in the SRM into a set of registers specified by the receive instruction, wherein the set of registers specified with the receive instruction includes data registers and a return identifier register. In a further aspect, the method further includes in the current context of the destination PSE, performing processing operations in accordance with subsequently executed instructions. In another further aspect, the method further includes in the current context of the destination PSE, executing a resume rendezvous instruction which specifies a set of return values and the return identifier register. In yet a further aspect, the method further includes sending a resume rendezvous message to the source PSE specified by a value in the return identifier register, wherein the resume rendezvous message includes the source PSE address, the identifier of the current context in the source PSE, and return values from the processing operations. In another aspect, the method further includes in the source PSE: receiving a resume rendezvous message from the destination PSE; extracting an identifier of the current context in the source PSE from the resume rendezvous message; saving return values in the resume rendezvous message into the set of receive registers. In yet a further aspect, the method further includes in the source PSE: marking the current context in the source PSE identified by the identifier as schedulable. In another aspect, the source PSE and the destination PSE are the same and the current context of the source PSE is different than the current context of the destination PSE.

In yet another embodiment, a method of handling messages between contexts in a processing system includes executing a send and rendezvous instruction in a context in a source processing system element (PSE), wherein the send and rendezvous instruction specifies a destination PSE, a queue address of the destination PSE, and a receive register in the source PSE; sending a send and rendezvous message from the source PSE to the destination PSE, wherein the send and rendezvous message specifies the queue address of the destination PSE, an address of the source PSE, and a context identifier in the source PSE; receiving a resume rendezvous message in the source PSE from the destination PSE, wherein the resume rendezvous message specifies the address of the source PSE, the context identifier in the source PSE, and return values from the destination PSE. In one aspect, the method further includes executing a receive instruction in a context in the destination PSE to receive the send and rendezvous message from the source PSE; executing a resume rendezvous instruction in the destination PSE, wherein the resume rendezvous instruction specifies a set of return value registers and a return identifier register. In yet a further aspect, the method further includes sending the resume rendezvous message from the destination PSE to the source PSE.

What is claimed is:

1. A method of handling requests between contexts in a processing system comprising:
   in a current context of a source processing system element (PSE):
      executing a send-and rendezvous instruction that specifies a destination PSE, a queue address in the destination PSE, a set of source registers, and a set of receive registers; and
      sending a send-and-rendezvous message (SRM) to the destination PSE, wherein the SRM includes an address of the destination PSE, a destination queue address, a source PSE address, and an identifier of the current context in the source PSE;
   in a current context of the destination PSE,
      executing a receive instruction to receive information in the SRM into a set of registers specified by the receive instruction, wherein the set of registers specified with the receive instruction includes data registers and a return identifier register;
      performing processing operations in accordance with subsequently executed instructions;
      executing a resume rendezvous instruction which specifies a set of return values and the return identifier register; and
      sending a resume rendezvous message to the source PSE specified by a value in the return identifier register, wherein the resume rendezvous message includes the source PSE address, the identifier of the current context in the source PSE, and return values from the processing operations.

2. The method of claim 1, further comprising:
   marking the current context as unschedulable.

3. The method of claim 1 wherein:
   the source PSE and the destination PSE are the same and the current context of the source PSE is different than the current context of the destination PSE.

4. A method of handling requests between contexts in a processing system comprising:
   in a current context of a source processing system element (PSE):
      executing a send-and rendezvous instruction that specifies a destination PSE, a queue address in the destination PSE, a set of source registers, and a set of receive registers; and
      sending a send-and-rendezvous message (SRM) to the destination PSE, wherein the SRM includes an address of the destination PSE, a destination queue address, a source PSE address, and an identifier of the current context in the source PSE;
   in the source PSE:
      receiving a resume rendezvous message from the destination PSE;
      extracting an identifier of the current context in the source PSE from the resume rendezvous message; and
      saving return values in the resume rendezvous message into the set of receive registers.

5. The method of claim 4 further comprising:
   in the source PSE:
      marking the current context in the source PSE identified by the identifier as schedulable.

6. The method of claim 4, further comprising:
   marking the current context as unschedulable.

7. The method of claim 4, further comprising:
   in a current context of the destination PSE,
      executing a receive instruction to receive information in the SRM into a set of registers specified by the receive instruction, wherein the set of registers specified with the receive instruction includes data registers and a return identifier register.

8. The method of claim 7 further comprising:
   in the current context of the destination PSE,
      performing processing operations in accordance with subsequently executed instructions.

9. The method of claim 8 further comprising:
   in the current context of the destination PSE,
      executing a resume rendezvous instruction which specifies a set of return values and the return identifier register.

10. The method of claim 9 further comprising:
    sending a resume rendezvous message to the source PSE specified by a value in the return identifier register, wherein the resume rendezvous message includes the source PSE address, the identifier of the current context in the source PSE, and return values from the processing operations.

11. The method of claim 7 wherein:
    the source PSE and the destination PSE are the same and the current context of the source PSE is different than the current context of the destination PSE.

12. A method of handling requests between contexts in a processing system comprising:
    in a current context of a source processing system element (PSE):
       executing a send-and rendezvous instruction that specifies a destination PSE, a queue address in the destination PSE, a set of source registers, and a set of receive registers; and
       sending a send-and-rendezvous message (SRM) to the destination PSE, wherein the SRM includes an address of the destination PSE, a destination queue address, a source PSE address, and an identifier of the current context in the source PSE;
    in a current context of the destination PSE,
       executing a receive instruction to receive information in the SRM into a set of registers specified by the receive instruction, wherein the set of registers specified with the receive instruction includes data registers and a return identifier register;
       executing a resume rendezvous instruction which specifies a set of return values and the return identifier register; and
       sending a resume rendezvous message to the source PSE specified by a value in the return identifier register, wherein the resume rendezvous message includes the source PSE address, the identifier of the current context in the source PSE, and return values from the processing operations.

13. The method of claim 12, further comprising:
    in the source PSE:
       receiving the resume rendezvous message from the destination PSE;
       extracting the identifier of the current context in the source PSE from the resume rendezvous message; and
       saving the return values in the resume rendezvous message into the set of receive registers.

14. The method of claim 13 further comprising:
    in the source PSE:

marking the current context in the source PSE identified by the identifier as schedulable.

15. The method of claim 12, further comprising:
marking the current context as unschedulable.

16. The method of claim 12 wherein:
the source PSE and the destination PSE are the same and the current context of the source PSE is different than the current context of the destination PSE.

* * * * *